United States Patent [19]
Kozuki et al.

[11] 4,054,888
[45] Oct. 18, 1977

[54] MOTOR DRIVEN PHOTOGRAPHING CONTROL CIRCUIT

[75] Inventors: Susumu Kozuki, Yokohama; Toshikazu Ichiyanagi, Tokyo; Yoshiaki Watanabe, Fujisawa; Takashi Uchiyama, Yokohama; Akio Sunouchi, Tokyo, all of Japan

[73] Assignee: Canon Kabushiki Kaisha, Tokyo, Japan

[21] Appl. No.: 712,424

[22] Filed: Aug. 6, 1976

[30] Foreign Application Priority Data

Aug. 9, 1975  Japan .................................. 50-96909

[51] Int. Cl.² ............................ G03B 7/08; G03B 1/18
[52] U.S. Cl. .................................. 354/50; 354/38; 354/60 R; 354/60 L; 354/173
[58] Field of Search ............... 354/36, 37, 38, 50, 354/51, 60 R, 60 E, 60 C, 170, , 171, 173, 204, 205, 212

[56] References Cited

U.S. PATENT DOCUMENTS

| | | | |
|---|---|---|---|
| 3,754,455 | 8/1973 | Tsujimoto et al. | 354/173 |
| 3,898,679 | 8/1975 | Ogiso et al. | 354/204 |
| 3,946,409 | 3/1976 | Toyoda | 354/173 |
| 3,994,003 | 11/1976 | Iwashita et al. | 354/173 |

*Primary Examiner*—Russell E. Adams
*Attorney, Agent, or Firm*—Toren, McGeady and Stanger

[57] ABSTRACT

A motor driven photographing control circuit for a double preference type automatic exposure control camera which is used for continuous photographing with a motor drive device attached thereto. When a sum of the shutter time computed by a shutter time computing circuit and the length of time required for a winding operation become longer than a preset photographing cycle in carrying out such continuous photographing, an alarm is displayed giving a warning that photographing in the preset cycle is not possible. Concurrently with this, a stop preference mode of photographing is shifted to a shutter preference mode and the shutter is controlled to be operated at a preset length of time, so that continuous photographing can be accomplished in a set cycle.

9 Claims, 9 Drawing Figures

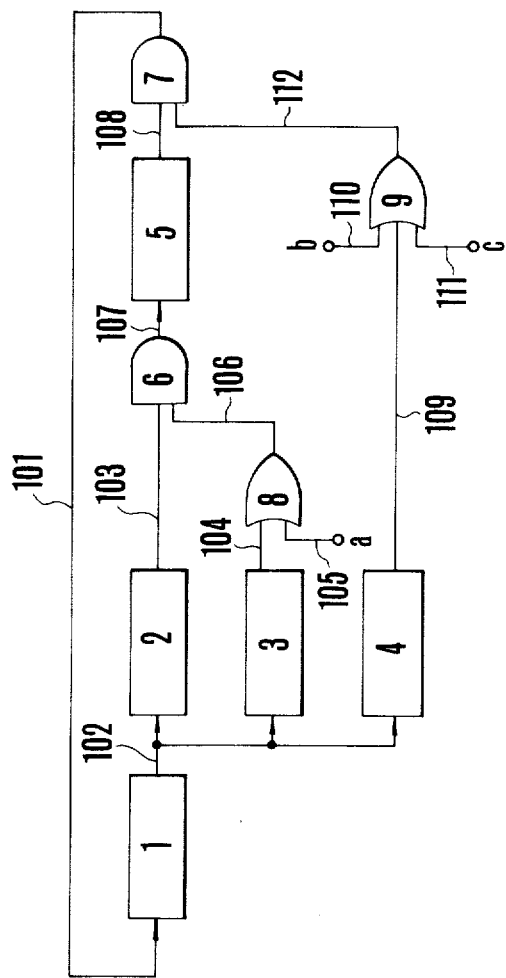
F I G. 1

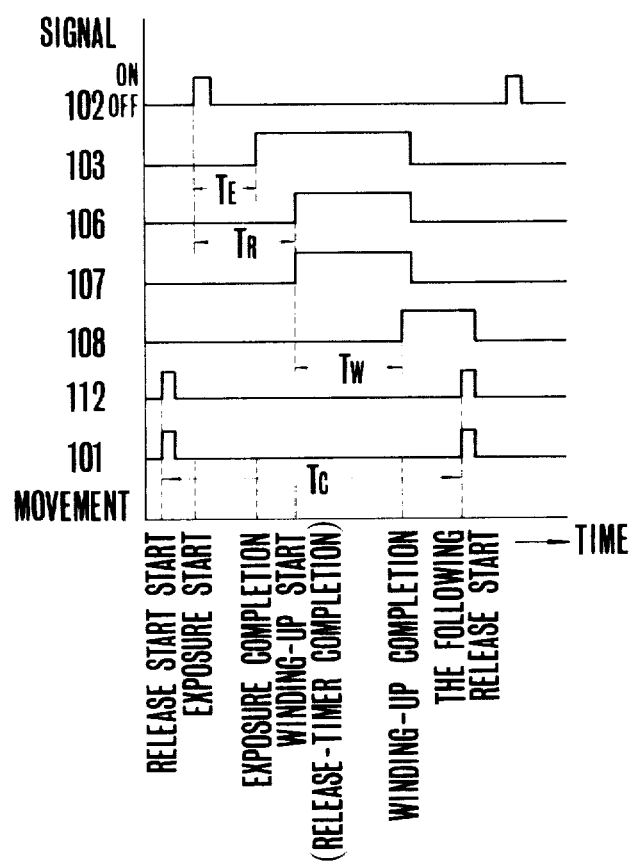

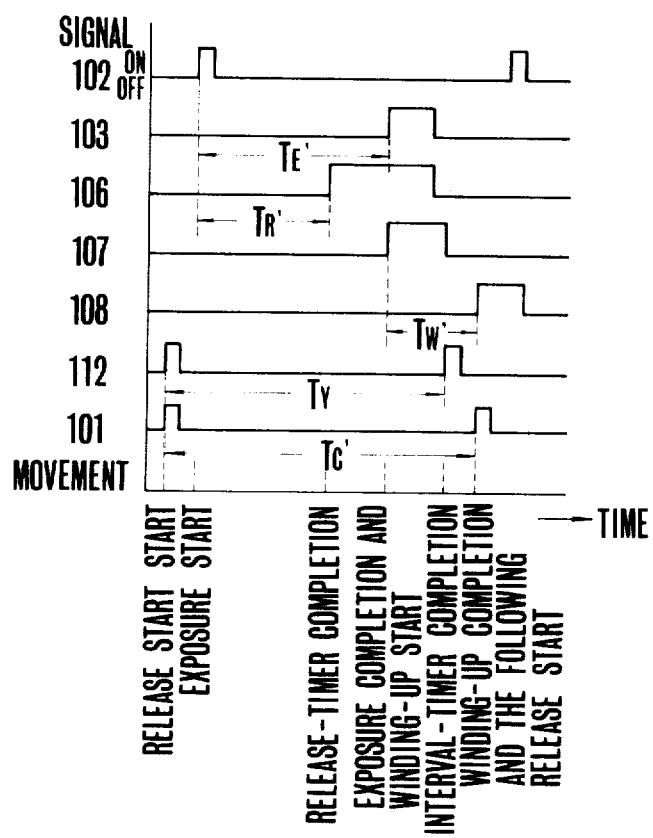

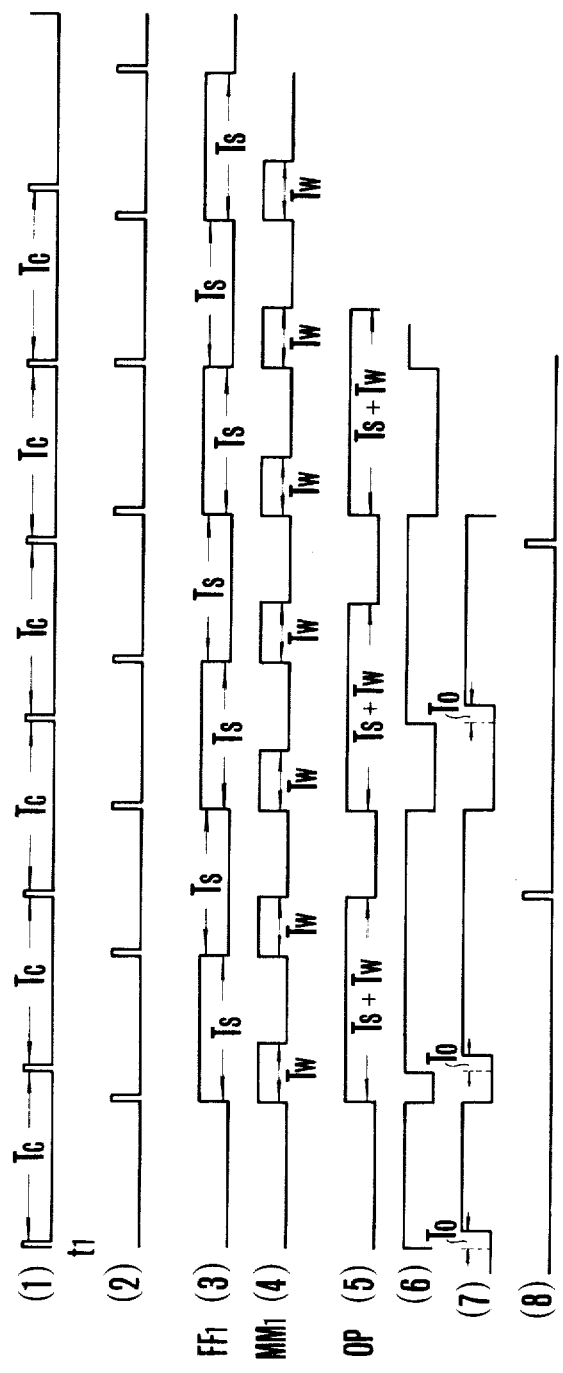

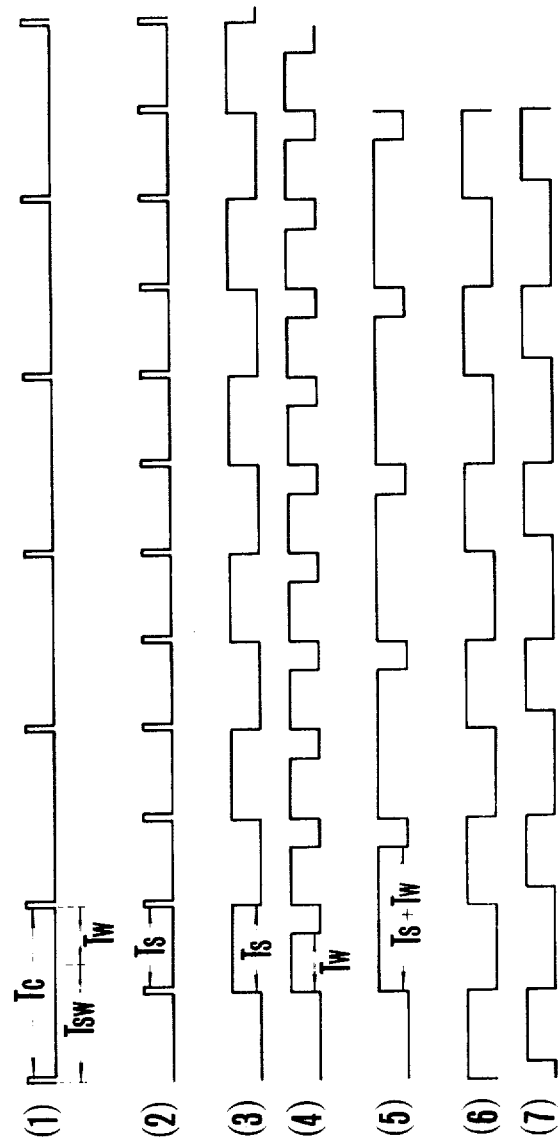

MOTOR DRIVEN PHOTOGRAPHING CONTROL CIRCUIT

BACKGROUND OF THE INVENTION:

1. Field of the Invention:

This invention relates to a motor driven photographing control circuit which controls a double preference type automatic exposure control camera used in combination with a motor drive device for continuous photographing.

2. Description of the Prior Art:

Among single-lens reflex cameras of advanced types, TTL-AE cameras which are equipped with automatic exposure control devices of so-called TTL systems are used for various purposes. The cameras of this kind are divided into two types. One is a shutter preference type wherein the shutter speed is first set and then the optimum stop value is automatically obtained. The other is a stop preference type wherein the stop value is first decided and then the shutter speed is automatically obtained. The advantage of one type over the other depends upon the photographing conditions.

Therefore, for such TTL-AE cameras, it is considered most desirable to have a type that permits photographing in both the shutter preference mode and the stop preference mode with provision for selection between the two modes. For such a double preference mode, there have been disclosed various methods. On the other hand, motor driven AE cameras which are of such a double preference type and permit attachment of motor drive devices thereto have been developed to meet demands, which have increased particularly among news photographers and high class amateur photographers.

Heretofore, the motor driven cameras of this type have been generally prepared by attaching a motor drive unit to an AE camera of a shutter preference type. With such a MD (motor driven) camera, when continuous photographing is carried out by presetting the shutter speed at a given value, the time per frame of film in continuous photographing becomes almost constant. Whereas, when continuous photographing is carried out with a motor drive device attached to an AE camera of a stop preference type, the shutter speed is automatically changed by the AE (automatic exposure control) device according to the brightness of the object being photographed. By this, the number of frames of film per second in the continuous photographing accomplished with the motor drive device also varies. This causes some inconvenience.

In order to make continuous photographing in short cycles with a motor drive device attached to an automatic exposure controlled camera, when a first film frame has been exposed, the film is immediately wound up in response to an exposure completion signal and a shutter charging action is accomplished. Then, in responce to a winding completion signal, shutter is released from the charged state for carrying out photographing on a second film frame. The cycle Tc in such continuous photographing is expressed by the following formula:

$$Tc \approx TE + TW \qquad (1)$$

wherein TE indicates shutter time (exposure time). In a focal plane single-lens reflex camera, the shutter time is a length of time from shutter release to completion of the travel of a rear diaphragm. TW indicates a length of time required for film winding and shutter charging by a motor drive device. In Formula (1), when the winding time TW is about constant, the photographing cycle Tc will be also about constant in a shutter preference camera, because the preset shutter time is deemed to remain constant during a continuous photographing operation. However, in the case of a stop preference camera, the shutter time is determined by the automatic exposure control action of the camera according to the brightness of the object being photographed. With a stop preference camera, therefore, TE in Formula (1) varies and the continuous photographing cycle Tc also varies. To solve the problem of varying Tc in the stop preference mode, there is a method wherein a release timer is provided to begin counting concurrently with shutter release and a film winding operation is started by an output of an AND gate which is provided for a count completion signal of the release timer and an exposure completion signal.

Assuming that the continuous photographing cycle in accordance with this method is Tc' and the time controlled by a release timer is TR, when TR is longer than the exposure time TE, the cycle Tc' is expressed by:

$$Tc' \approx TR + TW \qquad (2)$$

In Formula (2) above, when the time TR of the release timer is set at a constant value, the photographing cycle Tc' becomes about constant. However, the winding-up time TW is not always constant but varies with variation in the torque of film winding, etc. Accordingly, it has been difficult to make the photographing cycle perfectly constant even by the above described method. Furthermore, such variation in Tc due to variation in TW takes place also in the case of a shutter preference mode. Therefore, the same difficulty has been experienced also in the shutter preference mode.

For the stop preference mode, there has been also disclosed another method wherein: In addition to the timer which controls the shutter time of the camera, there is provided an interval timer which determines the length of time between shutter release and the next shutter release, i.e. a photographing cycle; and a shutter release signal for the next photographing operation is produced by the output of an AND gate between a winding completion signal and a count completion signal of the interval timer. By this arrangement, even when winding is not completed within the preset cycle due to a prolonged shutter time, the next photographing operation can be smoothly started immediately after completion of winding. In this method, however, when the signal from the interval timer which determines the photographing cycle is supplied to the AND gate prior to the winding completion signal, the cycle TI of the interval timer becomes TI < TR + TW. Therefore, the continuous photographing cycle Tc becomes slower than the preset cycle TI of the interval timer.

SUMMARY OF THE INVENTION

It is an object of this invention to provide a motor driven photographing control crcuit whereby the cycle of photographing can be maintained at a constant length of time even when continuous photographing is carried out using a motor drive device in a stop preference mode.

It is another object of this invention to provide a motor driven photographing control circuit wherein the longest allowable shutter time calculated backward from a photographing cycle predetermined by an interval timer which controls the photographing intervals and a signal of the shutter time actually controlled inside the camera are compared; then, if the latter shutter time is longer than the former, an alarm signal is produced; and, concurrently with the alarm signal, shifting is effected to a circuit arrangement that affords a preference to the longest allowable shutter time.

It is a further object of this invention to provide a motor driven photographing control circuit wherein the highest preference is afforded to a photographing cycle between a first shutter release which is effected by an output signal from an interval timer and a second shutter release; and a signal representing the longest allowable shutter time which is determined considering the winding-up time, etc. as well as the photographing cycle set by the interval timer is supplied to a shutter time information source provided on the camera.

It is still another object of this invention to provide a motor driven photographing control circuit which is applicable to a camera to be operated in a stop preference mode. In accordance with the control circuit, a signal from a shutter time control circuit which is controlled through an exposure control circuit according to a preset stop value, etc. is compared with the above mentioned longest allowable time signal; and, when the longest allowable time is shorter than the shutter time, a warning signal is supplied into a view finder or the like while, at the same time, a preference is given to the longest allowable time and the preset stop is controlled accordingly.

Further objects, features and advantages of this invention will become manifest to those versed in the art upon making reference to the following detailed description of preferred embodiments thereof and the accompanying sheets of drawings.

BRIEF DESCRIPTION OF THE DRAWINGS

In the accompanying drawings,

FIG. 1 is a block diagram illustrating a continuous photographing operation with a conventional motor drive device.

FIGS. 2A and B are timing charts illustrating the timing of the operation illustrated in FIG. 1.

Figure 4:
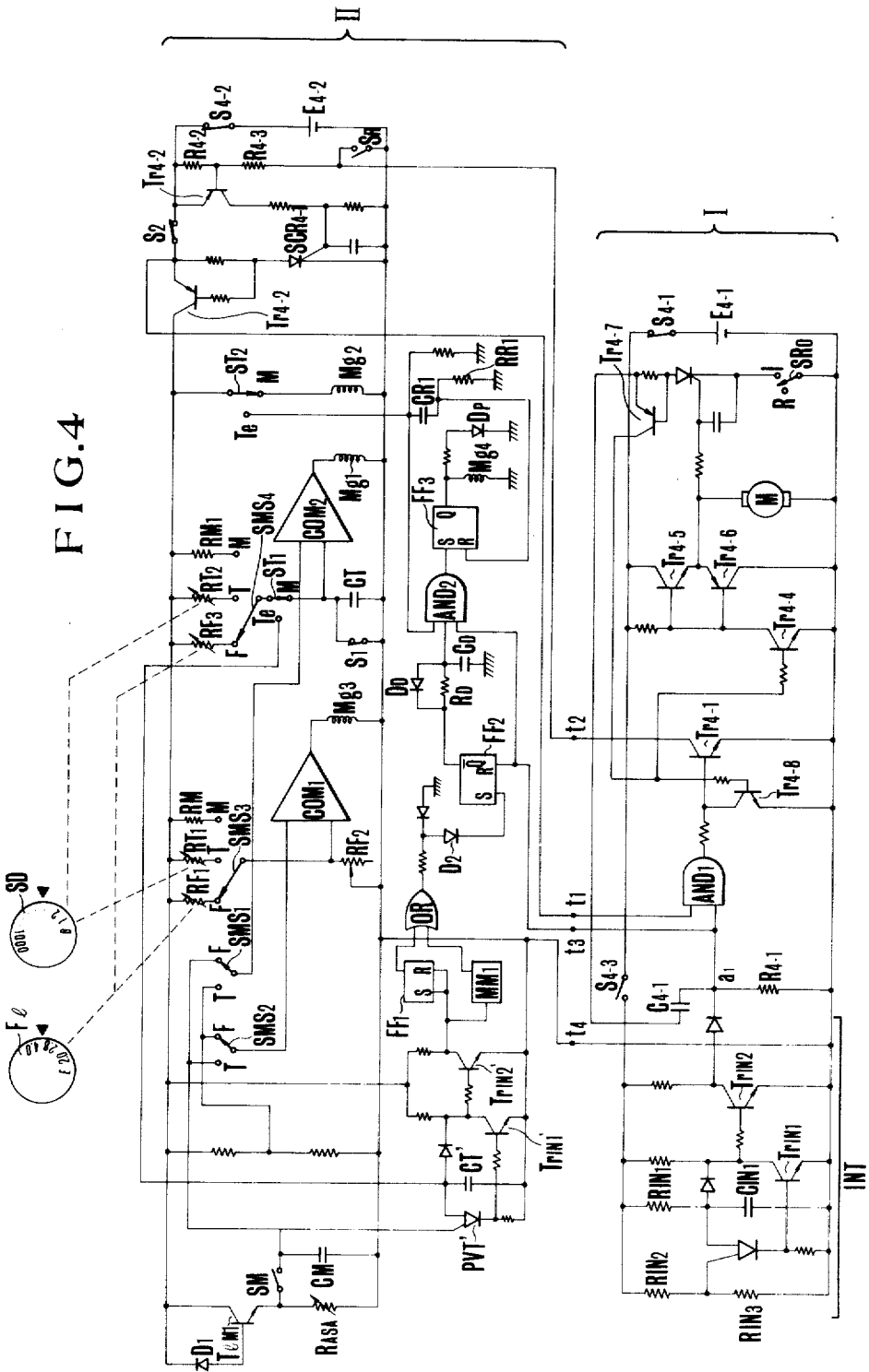
FIG. 4 is a circuit diagram illustrating an embodiment example of the motor driven photographing control circuit of this invention.

FIG. is a schematic view illustrating the structural linkage in the motor drive device and the camera illustrated in FIG. 4.

FIG. 6A and 6B are timing charts illustrating the operation of the circuit illustrated in FIG. 4.

Figure 5:
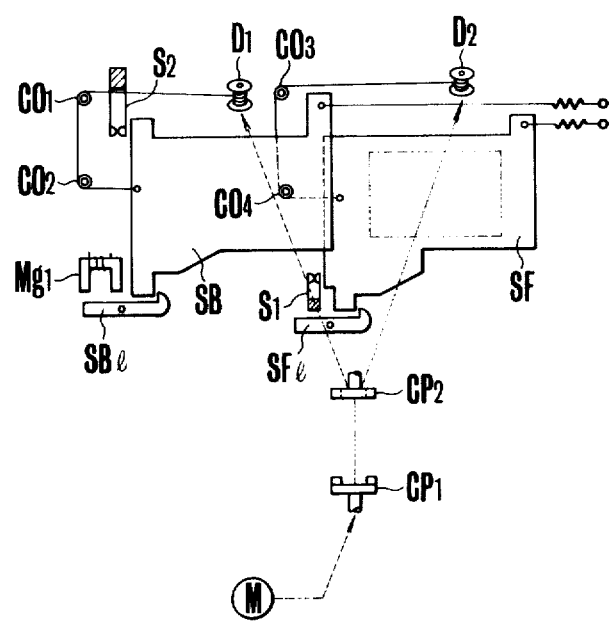
Figure 7:
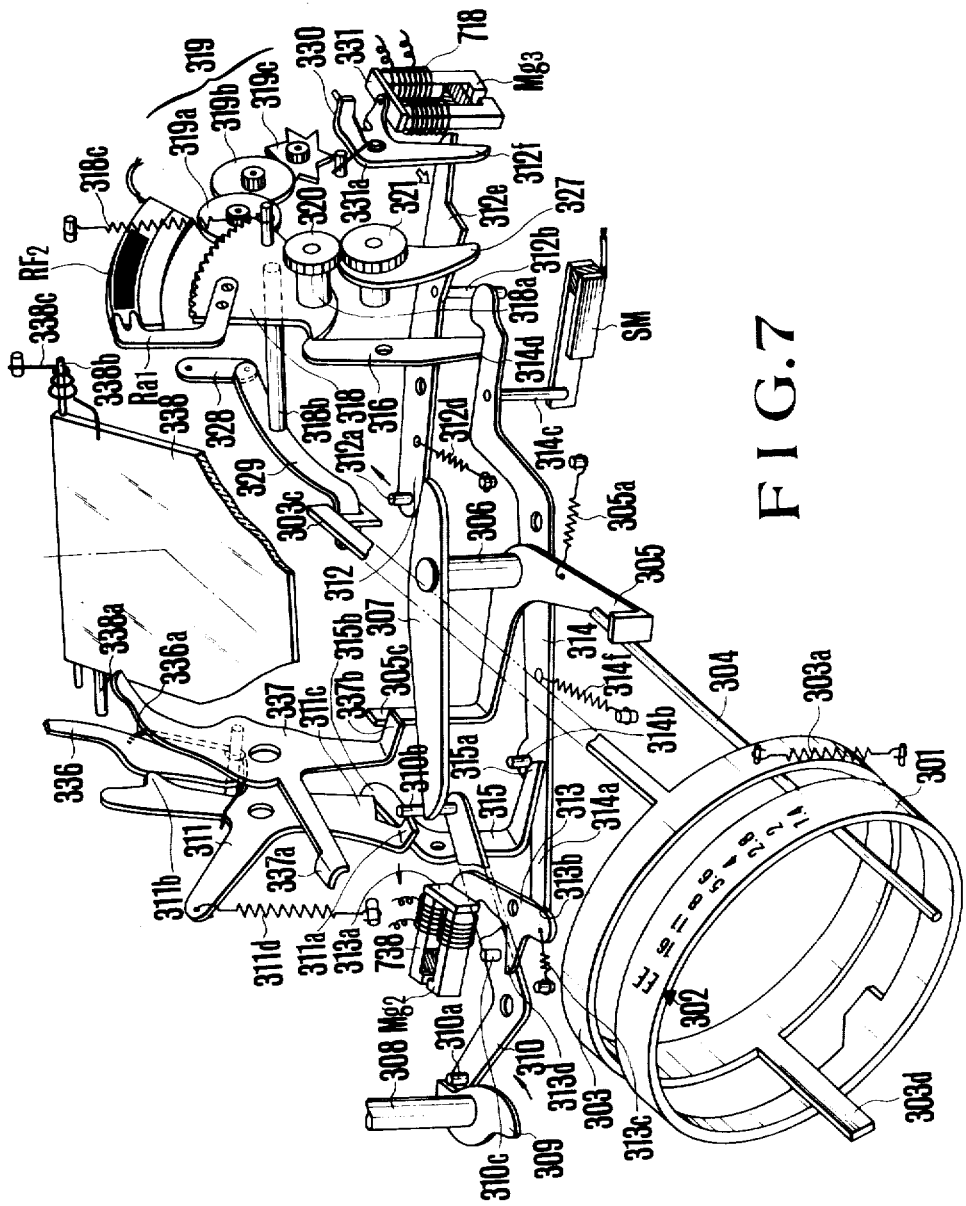

FIG. 7 is an oblique view illustrating the structural details of the camera shown in FIGS. 4 and 5.

DESCRIPTION OF THE PREFERRED EMBODIMENTS

In FIG. 1 which is a block diagram illustrating a continuous photographing operation to be carried out with the conventional motor drive device, a reference numeral 1 indicates a shutter release means. With a shutter button (provided on the side of the camera or on the motor drive side) operated, an exposure starting signal 102 is produced as an output of the shutter release means. A shutter time control means 2 is composed of, for example, a known timing circuit and produces an exposure completion signal 103 as an output to close the shutter. A reference numeral 3 indicates a release timer control means and 4 an interval timer control means. Both of the control means 3 and 4 start counting in response to the exposure starting signal 102. A winding means 5 serves to wind-up the film and charges the shutter. A winding completion signal 108 is produced as an output of the winding means 5. Reference numerals 6 and 7 indicate AND gates; 8 and 9 indicate OR gates; a reference symbol "a" indicates an input terminal for a release timer off signal; a reference symbol "b" an input terminal for an interval timer off signal; and a reference symbol "c" an input terminal for a trigger signal from the outside. Reference numerals 101 and 102 indicate the input and output signals of each means. FIG. 2 shown the timing of these signals as an example.

Referring to FIG. 2, the operation of the circuit shown in FIG. 1 is described as follows: For continuous photographing operation of a camera with a motor drive, a shutter release starting signal 101 is supplied to the shutter release means 1 when the photographer manually operates the release button (or a lever). In response to this input signal 101, the release means releases the shutter and, at the same time, produces the exposure starting signal 102, which is supplied to the shutter time control means 2, the release timer control means 3 and the interval timer control means 4 respectively. Then, the shutter time control means 2 performs counting as much as the preset length of the shutter time and, upon completion of counting, closes the shutter and at the same time produces the exposure completion signal 103. The release timer control means 3 and the interval timer control means begin counting in response to the signal 102. The output 103 from the shutter time control means 2 becomes a first input to the AND gate 6, then, when a release timer completion signal 104 produced upon completion of the counting of a preset length of time by the release timer control means 3 is impressed on the AND gate 6 as a second input signal thereto, the AND gate 6 produces an output 107. The output 107 is supplied to the winding means 5 and becomes a winding start signal. The winding means 5 performs a film winding and shutter charging operation and, upon completion of the operation, produces a winding completion signal 108, which becomes a first input signal to the AND gate 7. On the other hand, the interval timer control means, which has begun its counting in response to the exposure start signal 102, produces an interval timer completion signal 109. Then, an interval timer completion signal 112 is supplied through an OR gate 8 to the AND gate 7 as a second input signal. The AND gate for these signals 108 and 112 serves to supply the release start signal 101 again to the shutter release means through a feedback loop to repeat the above mentioned processes for continuous photographing. Furthermore, when a release timer off signal 105 is supplied to the terminal "a", the release timer becomes inoperative. Thus the signal 105 is used when the use of the release timer is not required. When an interval timer off signal 110 is supplied to the terminal "b", the interval timer circuit is turned off; and then the AND gate 7 can be operated by supplying a trigger signal 111 from the outside to the terminal "c".

FIG. 2 consists of two timing charts A and B showing the relation of the on-and-off conditions of signals shown in FIG. 1 to the operating conditions of the camera. In FIG. 2, the chart A represents, so to say, a normal condition wherein the exposure time TE is longer than the release timer control completion time TR and wherein interval timer control completion time Tc is longer than the sum of time the start of shutter release to the start of winding and the time TW required for film winding. Namely, in the condition as illustrated in FIG. 2(A), the actual photographing cycle completely coincides with the set cycle of the interval timer. In the condition as illustrated in FIG. 2(B), the exposure time TE' is longer than the release timer control completion time TR'. By this, winding begins concurrently with completion of exposure. Furthermore, since the time Tc' which is from the start of shutter release to the completion of film winding is longer than the set time TI of the interval timer, the actual photographing cycle Tc' which is up to the start of the next shutter release becomes longer than the cycle by the interval timer. This represents a state of stop preference. It is a disadvantage of such stop preferential condition that the photographing cycle becomes unstable when the exposure time becomes long. On the other hand, the maximum (allowable) shutter time signal provided in accordance with this invention represents a length of shutter time precalculated by subtracting a given length of time TS required for film winding from the cycle TI set by the interval timer shown in FIG. 2.

Figure 3:
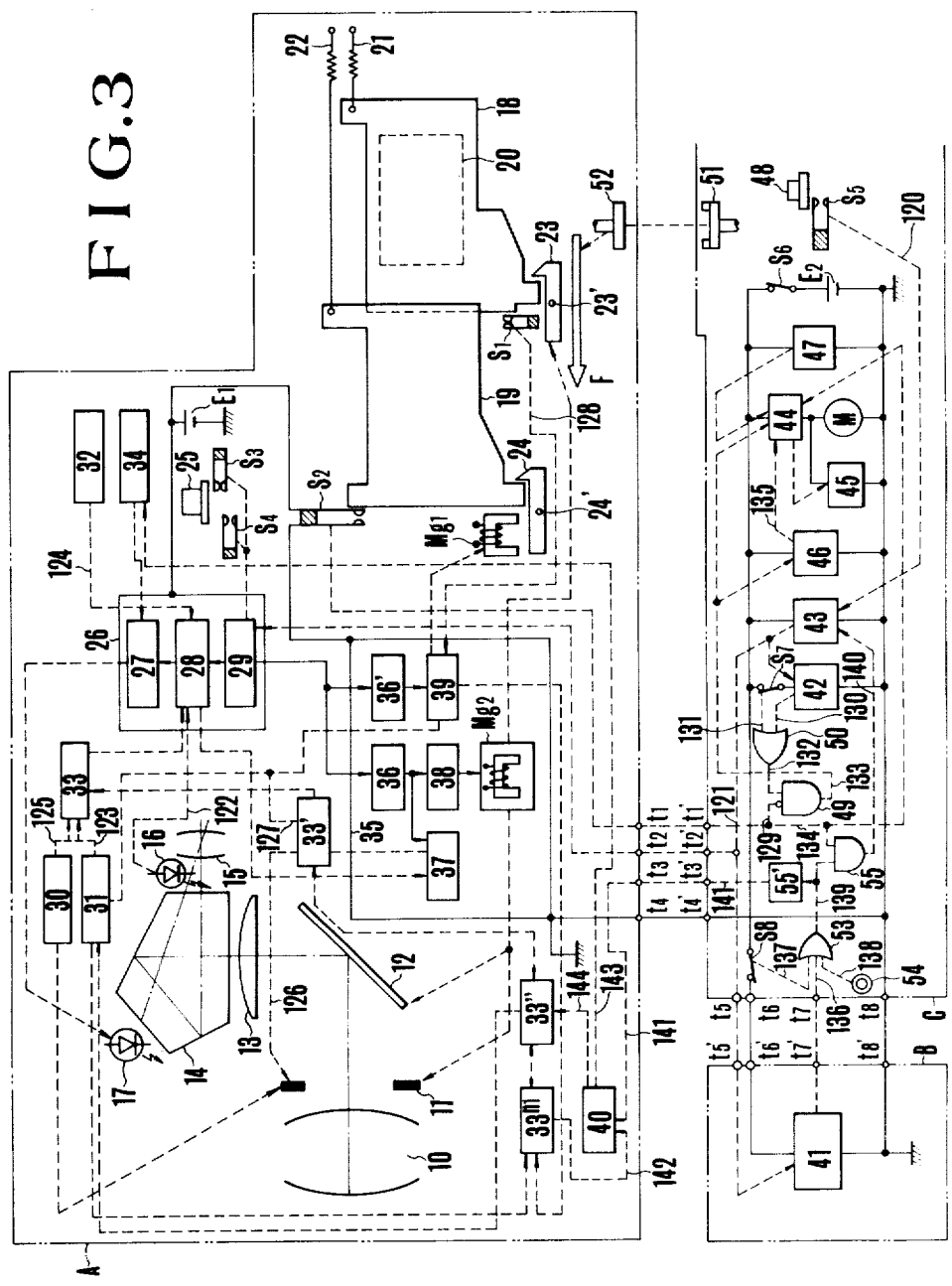
FIG. 3 is a block diagram illustrating the operating principle of this invention.

FIG. 3 is a block diagram of an embodiment of this invention illustrating the operating principle of the invented motor driven photographing control circuit as applied to a motor driven, double preference type TTL-AE single-lens reflex camera. Referring now to FIG. 3, a block A enclosed with an alternate long and short dash line represents a camera body. A block B represents an interval timer and another block C a motor drive device. Directional dotted lines indicates the routes through which signals are transmitted. The reference numerals used in FIGS. 1 and 2 are used also in FIG. 3 to indicate lke signals and numerals such as 120 etc. are attached to these dotted signal route indicating lines to identify these signals. Inside the camera body A, reference numerals 10 through 15 indicate the optical system of the camera, 10 indicating a photographing lens, 11 a stop, 12 a mirror, 13 a condenser lens, 14 a pentagonal prism and 15 an eye lens. The reference numeral 16 indicates a light receiving element and 17 indicates a displaying means such as a light emitting diode provided for displaying an alarm with regard to shutter time and photographing stop. Reference numerals 18 through 24 indicate the essential parts constituting a focal plane shutter of the single-lens reflex camera, 18 indicating a front diaphragm of the shutter, 19 a rear diaphragm, 20 an aperture portion, 21 a front diaphragm running spring, 22 a rear diaphragm running spring, 23 a front diaphragm clamping lever and 24 a rear diaphragm clamping lever. The reference symbol S1 indicates a count starting switch for an electrical shutter interlocked with the front diaphragm; S2 indicates a safety switch which remains on during the period of time from completion of film winding (completion of charging the rear diaphragm) and the travel of the rear diaphragm; Mg1 indicates a rear diaphragm running magnet. The reference numeral 25 indicates a release button provided on the camera body; S3 indicates a photometric and displaying switch which is turned on by the first stroke of the release button 25; and S4 indicates an exposure control and shutter release switch which is turned on by the second stroke of the release button 25. The reference numeral 26 indicates a circuit comprising a display circuit 27, a photometric circuit 28 and a shutter release circuit 29. The circuit 26 is directly connected to a power source E1 of the camera body. The reference numeral 30 indicates a source of information on photographing stop. The stop information source 30 is set when the camera is used as a stop preference type camera. The reference numeral 31 indicates a shutter time information source, which is set when the camera is used as a shutter preference type camera. The reference numeral 32 indicates a film sensitivity information source. A signal from the film sensitivity information source 32 is supplied to the photometric circuit 28 together with a signal which is supplied to the circuit 28 through a mode selection circuit 33 from the shutter time information source 31, in the case of the shutter preference mode, or from the stop information source in the case of the stop preference mode. The output of an alarm circuit 34 provided for the purpose of battery checking or finding mis-setting (will be described hereinafter) is supplied to the above mentioned display circuit for configuration through disply made by means of the light emitting diode 17 provided in the view finder. The reference numeral 35 indicates a circuit comprising self-holding circuits 36 and 36' employed as a switching means, an exposure control circuit 37, a release mechanism drive circuit 38 and a shutter time control circuit 39. The circuit 35 is connected to a power source E1 in the camera body through a safety switch S2. While the photometric circuit 28 and display circuit 27 can be turned on by depressing the release button 25 whatever phase the camera may be in, the exposure control circuit 37, release mechanism drive circuit 38 and the shutter time control circuit 39 are on only when the safety switch S2 is on, i.e. only during the period between completion of charging the rear diaphragm 19 of the shutter and travel of the rear diaphragm. The reference symbol Mg2 indicates a shutter release magnet provided for driving the stop 11, lifting the mirror 12 and allowing the front diaphgram of the shutter to travel. The reference numerals 33, 33', 33" and 33''' indicate mode selection circuits which are provided for selection between the shutter preference mode and the stop preference mode of operation of the camera and are controlled by manual shifting operation. These mode selection circuits 33, 33', 33" and 33''' are interlocked with each other. Of these circuits, 33''' performs switching between the signal of the photographing shutter information source 31 and the signal of the shutter time control circuit 39 and supplies the signal to a comparison circuit 40. Another input signal to the comparison circuit 40 is a signal from the motor drive device C.

In the interval timer B, the reference numeral 41 indicates a timer circuit of a known type. The motor drive device C is composed of the following parts: A release timer circuit 42; a release circuit 43; a switching circuit 44 which controls the on-and-off operation of a film winding motor M; and a brake circuit 45 for a motor M. The reference numeral 46 indicates a delay circuit which automatically stops the motor M when a film winding operation has not been completed by the motor within a present length of time; 47 indicates a selection circuit provided for selection between continuous photographing and photographing one frame at a time; 48 indicates a release button provided on the side of the motor drive device; S5 indicates a switch which is turned on when the release button is depressed; E2 indicates a power source for the motor drive device; S6 indicates main switch of the motor drive device; S7 indicates a switch which is provided for controlling the non-operating time of the release timer; and S8 indicates a switch width which determines the use or nonuse of the interval timer B.

The motor driven camera which is arranged as described in the foregoing operates as follows: Let us assume that both the camera body A and the motor drive device C are in a state of having completed a film winding operation. When the release switch S5 is turned on by depressing the release button 48 provided in the motor drive device C, the release circuit 43 is turned on by the start signal 120 and the shutter release start signal 121 is supplied to the shutter release circuit 29 in the camera body through terminals t2 and t2'. At the same time, the signal 121 is supplied to the interval timer circuit 41 in the interval timer B through terminals t5 and t5'. When the switch S8 is on (that is when the interval timer is to be used), the interval timer circuit 41 begins to count the present length of time. Furthermore, the shutter release start signal 121 is supplied also to the release timer circuit 42, which then begins counting the present length of time. Since the circuit 26 is turned on concurrently with the shutter release circuit 29, the display circuit 27 and the photometric circuit 28 are also turned on.

When the camera illustrated in FIG. 3 is to be used in the shutter time proference mode, the object brightness signal 122 from the light receiving element 16, the present shutter time signal 123 from the shutter time information source 31 through the mode selection circuit 33 and the film sensitivity signal 124 from the film sensitivity information source 32 are supplied to the photometric circuit 28. When the camera is to be used in the stop preference mode, the object brightness signal 122 from the light receiving element 16, the present stop signal 125 for photographing coming from the photographing stop information source 30 through the mode selection circuit 33 and the film sensitivity signal 124 from the film sensitivity information source 32 are supplied to the photometric circuit 28 in the same manner. In this case, the stop 11 is manually preset.

The photometric circuit 28 accomplishes a photometric operation based on this information. The output of the circuit 28 including information on the stop value or shutter time, etc. are supplied to the display circuit 27. Then, in accordance with the output of the photometric circuit 28, the stop value, shutter time, etc. are displayed in the view finder by means of the light emitting diode. Upon completion of the photometric operation, the circuit 35 is turned on. (Since the camera is then in a state of having completed a film winding operation, the shutter is charged and the safety switch S2 is on). In the circuit 35, the self-holding circuits 36 and 36' first begin to operate. Therefore, even when the release switch S5 is turned off with the release button 48 of the device C being released from the depressed state thereof, the circuit 35 is kept on after completion of the exposure. Concurrently with this, the exposure control circuit 37 begins to operate. Since the camera has already been shifted to the shutter preference mode, the optimum stop value determined through the photometric circuit 28 is supplied to the stop 11 as a preset stop signal 126, through the mode selection circuit 33', and the stop 11 is preset accordingly.

For using the camera in the stop preference mode, the optimum shutter time determined by the photometric circuit 28 is supplied as a shutter time signal 127 through the mode selection circuit 33' to the shutter time control circuit 39. Then, synchronously with this, the release mechanism drive circuit 38 begins to operate to turn the shutter releasing electromagnet Mg2 on, to stop down the stop 11 to a preset stop value (to a preset stop value for stop preference and to a stop value determined by a preset stop signal 126 in the case of shutter preference) and, at the same time, to lift the mirror 12. Then, the circuit 38 causes the clamping lever 23 to rotate clockwise on its shaft 23' to release the front diaphragm 18 of the shutter from a state of being locked by the lever. By this, the spring 21 causes the front diaphragm of the shutter to travel in the direction reverse to the direction of arrow F. When the front diaphragm 19 begins to travel, the exposure start signal 128 from the count starting switch S1 causes the shutter time control circuit 39 to begin to count the set shutter time (a preset length of shutter time in the case of the shutter preference mode and a length of shutter time determined by the shutter time signal in the case of the stop preference mode).

Upon completion of the counting of the preset length of time, the shutter time control circuit 39 of the circuit 35 turns on the rear diaphragm running electromagnet Mg1. With the electromagnet Mg1 turned on, the rear diaphragm clamping lever 24 rotates clockwise on its shaft 24. The spring 22 then causes the rear diaphragm 19 of the shutter to travel in the direction reverse to the direction of arrow F. The safety switch S2 is turned off upon completion of exposure.

When the safety switch S2 is turned off, the circuit 38 is also turned off. Then, an exposure completion signal 129 is supplied through terminals t1 and t1' as a second input signal to the AND gate 49 disposed inside the motor drive device C. The release timer completion signal 130 produced by the release timer circuit 42 of the device C is supplied as a first input signal to the OR gate 50. A second input signal to the OR gate 50 is a release timer off signal 131 which is derived by turning the switch S7 off. Therefore, when the release timer is not used, the OR gate 50 produces a release completion signal 132 upon completion of the counting of the preset time by the release timer. The release completion signal 132 is supplied as a second input signal to the AND gate 49. Accordingly, at the point of time when the shutter's rear diaphragm 22 has travelled and when a preset length of time has been counted by the release timer, a winding start signal 133 is supplied from the AND gate 49 to the switching circuit 44 and delay circuit 46. With the winding start signal 133 supplied to the delay circuit 46, the delay circuit begins to count a preset length of time. (The delaying time to be set for the delay circuit 46 must be set to be a little longer than the length of time normally required for winding up the film. Assuming that the time required for winding is varying between 150 ms and 300 ms or thereabout due to variation in the voltage of the power source E2 disposed inside the motor drive device C, the time to be delayed by the delay circuit 46 must be set, for example, at 500 ms or thereabout.) When the switching circuit 44 is turned on, the motor M begins to rotate. By this, the shutter's front and rear diaphragms 18 and 19 are moved in the direction of arrow, through the winding couplers 51 and 52 disposed inside the motor drive device C and the camera body A, in such a manner that the shutter charging operation is accomplished simultaneously with a film winding operation. Since the shutter charging operation is completed concurrently with the film winding operation, the safety switch S2 is turned on; a winding completion signal 134 is supplied to the AND gate 55 as the first input signal thereto; and the switching circuit 44 is turned off to cut off the power supply to the motor M. With the power supply cut off, the motor M is quickly stopped by the brake circuit 45.

Since, as described in the foregoing, the delaying time of the delay circuit 46 is set to be a little longer than the time required for film winding, when the film winding operation is normally accomplished, the switching circuit 44 is turned off according to a signal issued when the safety switch S2 is turned on and the motor is brought to a stop by the brake circuit 45. However, in cases where the winding mechanism stops working half-way in its film winding operation due to, for example, running out of the film, the safety switch is not turned on even after the delay time set at the delay circuit has elapsed; accordingly, the switching circuit 44 is kept on; and the power supply to the motor M is not cut off. Therefore, under such a condition, the switching circuit 44 is turned off by means of a count completion signal 135 produced from the delay circuit and the power supply to the motor M is cut off thereby.

Upon completion of counting the preset length of time, the above mentioned interval timer 40 supplies an interval timer completion signal 136 through terminals t7 and t7' to the OR gate 53 of the device C as the first input signal thereto. The second input signal to the OR gate 53 is an interval timer off signal which is produced when the switch S8 is turned off. The third input signal to the OR gate 53 is a trigger signal such as a signal from an oscilloscope or the like supplied through an exterior trigger terminal 54 or an exterior trigger signal 138 produced by the movement of an object being photographed. When the interval timer is not used or when an exterior trigger signal is supplied, the OR gate 53 produces as an output an interval completion signal 139 upon completion of counting of a preset time by the interval timer. The interval completion signal 139 becomes the second input signal to the AND gate 55. When the film winding has been completed and the interval has passed, the AND gate 55 supplies a shutter release start signal 140 to the release circuit 43. The release circuit again accomplishes the shutter releasing operation. A continuous photographing operation of the camera is accomplished by repeating what is described in the foregoing.

On the other hand, the interval completion signal 139 is supplied to a maximum allowable time computing circuit 55'. Then, a maximum allowable shutter time signal 141 which is obtained by subtracting the above mentioned time required for film winding and the period of time from start of shutter release to start of exposure from a photographing cycle according to the interval completion signal 139 and which makes the photographing cycle constant is supplied through terminals t3 and t3' to the comparison circuit 40 provided on the side of the camera body A. In the shutter preference mode, a preset signal from the photographing shutter information source 31 is supplied to the comparison circuit 40 through selection by the mode selection circuit 33'''; while, in the case of the stop preference mode, a signal from the shutter time control circuit is selected by the circuit 33'''' to be supplied to the comparison circuit 40. At the comparison circuit, the above mentioned maximum allowable shutter time signal 141 is compared with the shutter time signal 142 which is controlled within the camera. When the signal 141 is longer than the signal 142, a shutter time alarm signal 143 is supplied to the above mentioned alarm circuit 34. In response to the signal 143, the alarm circuit 34 displays, by means of a light emitting diode or the like, through the display circuit 27, a warning inside a view finder or the like that the photographing cycle preset by the interval timer will become longer.

Furthermore, when the camera is operated in the stop preference mode, a maximum shutter time signal 144 is supplied from the comparison circuit 40 through the mode selection circuit 33'' to the photographing shutter information source 31; then, with the mode shift permitting circuit 33' turned on, the circuits 33 and 33' serve to shift the stop preference mode to the shutter preference mode, or a maximum shutter time preference mode.

FIG. 4 is a circuit diagram illustrating an embodiment of the motor driven photographing control circuit of this invention as applied to a camera system with a motor drive device. In FIG. 4, the part I represents a motor drive device, wherein the reference symbol E4-1 indicates a power source, S4-1 indicates a power source switch; S4-3 a release switch; C4-1 a capacitor; R4-1 a resistor which cooperates with the capacitor C4-1 to impress an instantaneous high level release signal on a point $a1$ when the release switch S4-3 is turned on; and AND 1 an AND gate one input terminal of which is connected to the point $a1$ while the other input terminal is connected to the side of the camera body through a terminal $t1$. The reference symbol Tr4-1 indicates a transistor which is turned on by the output of the AND gate AND 1 and which thus serves to impress an exposure control signal onto the side of the camera body through a terminal $t2$ to bring the power source on the side of the camera body into an operative state; and Tr4-4 indicates another transistor which in combination with a transistor Tr4-5 constitutes a power supply transistor circuit for a motor M used for controlling the film winding and shutter changing operation, etc. The reference symbol Tr4-6 indicates a transistor for braking which is connected to the motor M with connection made between collector and emitter and between the terminals of the motor M. The reference symbol SR0 indicates a selector switch for selection between a continuous photographing mode and an individual frame photographing mode. Connection is made to a contact R for the continous photographing and to a contact I for the individual frame photographing mode. The reference symbol SCR4-2 indicates a thyristor which together with transistors Tr4-7 and Tr4-8 constitutes an individual frame photographing control circuit. The SCR4-2, Tr4-7 and Tr4-8 are turned on only when the switch SR0 is connected on the side of the contact I, the circuit being formed in such a way as to short circuit between the base and emitter of the above mentioned transistor Tr4-1. The reference symbol INT indicates an interval timer circuit which is a time constant circuit comprising voltage dividing resistors RIN2 and RIN3, a resistor $RIN_1$ and a capacitor $CIN_1$. A timer circuit of a known type is formed by these voltage dividing resistors and a programmable unijunction transistor PUT which is connected to the time constant circuit. The symbols $TrIN_1$ and $TrIN2$ indicate switching transistors connected to the output terminal of the unijunction transistor PUT. These transistors are arranged to transmit the pulses produced in a set cycle by the transistor PUT to the AND gate $AND_1$. The oscillating cycle of the interval timer is determined by the resistor $RIN_1$ and the capacitor $CIN_1$. The part II of FIG. 4 represents a control circuit of the camera. In the circuit, the reference symbol E4-2 indicates a power source; S4-2 a power source switch; SP indicates a shutter release switch which is turned on in response to an unillustrated shutter button; S2 indicates a switch which is kept on by the rear diaphragm of the shutter and remains on during a period of time from shutter winding to the travel of the rear diaphragm of the shutter; R4-2 and R4-3 indicate resistors, the resistor R4-3 being connected to the collector of the transistor Tr4-1 of the motor drive device through the terminal t2; SCR4-1 and Tr4-3 indicate a thyristor and a power supply transistor which constitute a power supply circuit together with a transistor Tr4-2; Mg2 indicates a magnet which actuates unillustrated stop driving members etc. of a known stop mechanism; $D_1$ indicates a light receiving element such as a photogralvanic element; T1M indicates a transistor the base of which is connected to the light receiving element $D_1$; RASA indicates a variable resistance which is provided for setting film sensitivity information in response to an unillustrated film sensitivity setting dial, the variable resistance RASA forming a photometric circuit in combination with the light receiving element $D_1$ and the transistor T1M; CM indicates a capacitor for memory; $SMS_1 - SMS4$ indicate a switch which shifts between a contact F and a contact T in respnse to an unillustrated photographing mode selecting means; SM indicates a memory switch which is turned off through the action of an unillustrated sto drive member; $RF_1$ and $RF_3$ indicates variable resistances which are interlocked with a stop ring F1 to show a resistance value corresponding to a preset stop value; $RT_1$ and RT2 indicate variable resistances interlocked with a shutter dial SD to show a resistance value corresponding to a preset shutter time; RF2 indicates a variable resistance which is interlocked with a stop preset ring to show a resistance value corresponding to a stop value restricted by the stop preset ring; COM indicates a comparator which produces an output when the stop reaches a preset stop value in the stop preference mode or when the stop reaches a stop value corresponding to the brightness of the object in the case of the shutter preference mode; Mg3 indicates a magnet which releases a shutter front diaphragm clamping lever to allow the shutter front diaphragm to travel in response to the output of the comparator $COM_1$; $S_1$ indicates a count switch which is turned off by the travel of the shutter front diaphragm; CT indicates a capacitor which forms a time constant circuit in conjunction with the resistance RF3 or RT2; COM2 indicates a comparator which is provided for controlling the shutter; $Mg_1$ indicates a magent which, in response to an output of the comparator COM2, releases a shutter rear diaphragm clamping lever to allow the rear diaphram to travel; PUT' indicates a programmable unijunction transistor the gate terminal of which is connected to the output terminal of the capacitor CM; and $ST_1$ indicates a test switch which connects to a terminal T in response to an unillustrated test button. In the stop preference mode, when the test button is depressed, the test switch $ST_1$ forms a time constant circuit in conjunction with the resistance RF3 and a capacitor CT' which is of the same capacity as the above mentioned capacitor CT. The capacitor CT' is connected to an anode terminal of the programmable unijunction transistor PUT' to form a timer circuit in conjunction therewith. As described in the foregoing, the terminal voltage of the capacitor CM is impressed on the gate of the timer circuit PUT' while the output of an time constant circuit of a time constant corresponding to the stop is impressed on the anode terminal of the timer circuit. Therefore, the timmer circuit produces a single pulse in the same cycle as the shutter time caluculated in the stop preference mode. The reference symbols $TrIN_1'$ and TrIN2' indicate switching transistors connected to the output terminal of the timer circuit PUT'; FF indicates a flip-flop circuit the set input terminal and the reset input terminal of which are connected to the collector of the transistor TrIN2' and $MM_1$ indicates a monostable multivibrator the trigger terminal of which is connected to the collector of the transistor TrIN2'. The inversion cycle of the multivibrator $MM_1$ is preset to be a cycle corresponding to a length of time required for the film winding operation which is accomplished by the motor drive device including a shutter charging action as well as film winding. The reference symbol OR indicates an OR gate; and FF2 indicates a flip-flop circuit the set terminal S of which is connected to the output terminal of the OR gate OR through a diode D2. The reset terminal R of the flip-flop circuit FF2 is connected to a terminal $a_1$. The output terminal $\overline{Q}$ of the flip-flop circuit FF2 is connected to a rise pulse delay circuit which is composed of a resistor RD, a capacitor CD and a diode DD. The reference symbol AND2 indicates an AND gate the input gates of which are connected to a point $a_1$, a delay circuit and a test switch ST2 which connects to the side of a terminal T in response to an unillustrated test button; FF3 indicates a flip-flop circuit having a set terminal connected to the AND gate AND2 and an output terminal $\overline{Q}$ connected to a light emitting diode DP and a magnet Mg4 which forms a relay circuit. $RM_1$ and RM2 indicate resistors having a resistance value corresponding to a length of time obtained by subtracting a length of time at least required for the film winding/shutter charging operation by the motor drive device from the cycle of the above mentioned interval timer. Furthermore, the switches SMS3 and SMS4 are interlocked to the magnet Mg4 and are shifted and connected to terminals M when the magnet Mg4 becomes operative, while the switches $SMS_1$ and $SMS_2$ are shifted and connected to the terminals T in response to the magnet Mg4 to bring about the shutter preference mode. Meanwhile the switch $ST_1$ and ST2 are also arranged to connect to the contacts M in response to the magnet Mg4. $CR_1$ and $RR_1$ indicate a capacitor and a resistor which constitute a reset circuit for the flip-flop circuit FF3. The reference symbols $t_1$ through t4 indicate connection terminals provided for connecting the motor drive device I to the camera body II.

FIG. 5 is a schematic view illustrating the structural linkage in the motor drive device I, and the camera body II shown in FIG. 4. In FIG. 5, the reference symbol M indicates the motor shown in FIG. 4; $CP_1$ indicates a coupler which is provided on the side of the motor drive device and which is interlocked with the motor to rotate therewith; CP2 indicates a coupler which is provided on the camera's side and engages with the coupler $CP_1$ when the motor drive device is attached to the camera body. $D_1$ and $D_2$ indicate winding drums which are interlocked with the couplers. $CO_1$ through $CO_4$ indicate rolls; SF a front diaphragm of the shutter; SF1 a clamping lever for clamping the shutter front diaphragm, the lever being arranged to release the front diaphragm from clamping in response to the magnet Mg3 shown in FIG. 4; SB a rear diaphragm of the shutter; and SB1 a rear diaphragm clamping lever which releases the rear diaphragm in response to the magnet $Mg_1$ shown in FIG. 4. The rectangle shown in a dotted line represents an aperture.

FIG. 6A and B are timing charts illustrating the operation of the circuit shown in FIG. 4.

The motor driven photographing control circuit of this invention as illustrated in FIGS. 4 and 5 operates as described below.

Assuming that the camera is in a state with the film having been wound up and the shutter having been charged, an unillustrated photographing mode selection switch is operated to select the stop preference mode. By this, the switches $SMS_1$ through $SMS_4$ are connected to terminals F. Now, before starting photographing, an unillustrated test button is depressed to connect switches $ST_1$ and ST2 to terminals Te. Under this condition, the power switches S4-1 and S4-2 which are interlocked with unillustrated exterior operating members of the motor drive device I and the camera II are turned on. Then, using an unillustrated operating member provided on the outside, the release switch S4-3 of the motor drive device I is turned on. This causes an electric current to flow to the capacitor C4-1 and the resistor R4-1 to give an instantaneous high level of potential at the point $a_1$. At this moment, the shutter is in an initial position as shown in FIG. 5 and the switch S2 is on. Therefore, the potential of the terminal $t_1$ is also at a high level. Accordingly, the output of the AND gate $AND_1$ instantaneously reaches a high level to turn the transistor Tr4-1 on. This causes an electric current flow to the transistor Tr4-1 through resistors R4-2 and R4-3 to turn the transistor Tr4-2 on. Voltage is impressed on the gate of the thyristor SCR4-1 to turn it on. By this, the transistor Tr4-3 is turned on the supply voltage to each circuit in the camera. On the other hand, the interval timer circuit INT remains in an operative state after the switch S4-3 is turned on (time $t_1$) and produces a pulse in a cycle determined by the resistor RIN and the capacitor CIN. Furthermore, with the transistor Tr4-3 turned on as mentioned in the foregoing, an electric current flows to the capacitor CT' through the resistance RF3 and switches SMS4 and $ST_1$ to begin charging the capacitor. Meanwhile, the photometric circuit comprising the light receiving element $D_1$ and the resistance RASA which has a resistance value corresponding to the sensitivity of the film operates to store a voltage value corresponding to the brightness of the object and the sensitivity of the film in the capacitor CM and this voltage is impressed on the gate terminal of the PUT'. Therefore, the PUT' begins to oscillate every time the voltage of the capacitor CT' reaches the terminal voltage of the capacitor CM. The oscillating cycle of the PUT' corresponds to the shutter time required for effecting exposure suitable for the object's brightness as shown at (2) in FIG. 6A, because the resistance value of the resistor RF3 has been set to correspond to the stop value preset by the stop ring F1 and because the gate potential of the PUT'has been made to correspond to the brightnes and the film sensitivity. Accordingly, transistors $TrIN_1'$ and TrIN2' perform switching at every cycle to trigger the flip-flop $FF_1$ and the monostable multivibrator $MM_1$ in this cycle. Then, the flip-flop circuit FF and the monostable multivibrator $MM_1$ produce outputs as shown at (3) and (4) in FIG. 6. Now, let us assume that the inversion time (on-time) of the monostable multivibrator $MM_1$ corresponds to a set period of time tw required for film winding, shutter charging and stop controlling. Since, the inversion time of the flip-flop circuit $FF_1$ has been made to correspond to the shutter time TS, the on-time of the output (FIG. 6A(5)) of the OR gate OR becomes TS + TW which represents the minimum length of time required for a photographing cycle. The output of the OR gate is transmitted to the set terminal S of the flip-flop circuit FF2 through the diode D2 to set it with the loading edge of the output pulse of the OR gate. Meanwhile, the oscillation pulse of the interval timer INT is supplied to the reset terminal of the flip-flop circuit FF2 to reset it in a cycle of a fixed length of time determined by the resistor RIN and the capacitor CIN of the interval timer. Then, the output $\overline{Q}$ of the flip-flop circuit FF2 becomes as shown at (6) in FIG. 6A. The output $\overline{Q}$ is delayed a preset length of time (TD) through a delay circuit consisting of the capacitor CD and the resistor RD and becomes an output as shown at (7) in FIG. 6A before it is impressed on the AND gate AND2. On the other hand, the output of the interval timer (FIG. 6A(1)) and an output of a constant high level coming through the switch STe are impressed on the other input terminal of the AND gate AND2. The output of the AND gate AND2 therefore becomes as shown at FIG. 6A(8) and sets the flip-flop circuit FF3. The AND output of the AND gate AND2 is produced only when the time required for resetting the flip-flop FF2 according to the cyclic time TC of the interval timer is shorter than the cyclic time Ts+Tw required for setting the flip-flop circuit FF2; and, since the interval timer is arranged to repeat photographing at intervals of time Tc and the photographing cycle is determined thereby, as will be described hereinafter, this means that photographing can not be carried out in a fixed cycle at the shutter time Ts. When the shutter time is not suitable for photographing in a fixed cycle as mentioned above, the flip-flop circuit FF3 is set by the output of the AND gate AND2 and the light emitting diode Dp is lighted to issue a warning; and, concurrently with this, the magnet Mg4 works to shift switches SMS3 and SMS4 from contacts F to contacts M and switches $SMS_1$ and SMS2 from contacts F to contacts T to effect switching from the stop preference mode to the shutter preference mode. At this time, the switches SThd 1 and $ST_2$ are also shifted from terminals T to terminals M. By this, the resistors $RM_1$ and RM2 are connected to the exposure control circuit. The resistance value of the resistors $RM_1$ and RM2 corresponds to the time Tsm which is obtained by subtracting the time Tw required for the above mentioned winding / charging operation from the photographing cyclic time Tc or, in other words the resistance value corresponds to the longest shutter time in the photographing operation to be carried out in a fixed cycle. Thus, the shutter preference mode of photographing is carried out according to such shutter time. When the output of the AND2 is produced, the switch ST2 is connected to the terminal M by the magnet Mg4. Then, an electric current flows to the magnet Mg2 to actuate the magnet Mg2. The switch SM is turned off through a known mechanism and the mirror is lifted up. Concurrently with this, the stop control action begins. As mentioned in the foregoing, swiches $SMS_1$ and $SMS_2$ are connected to terminals T and switches SMS3 and SMS4 to terminals M. Therefore, when magnet Mg2 is actuated, the stop preset ring begins to work and makes the resistance value of the resistor RF2 which is interlocked with the ring to become a value which corresponds to the stop aperture value restricted by the stop preset ring. The resistor RM2 is connected to the resistor RM2 which has a resistance value corresponding to the above stated shutter time Tsm. The connection point between these resistors is connected to an input terminal of the comparator $COM_1$ while the other input terminal of the comparator $COM_1$ is connected to the memory capacitor CM through the terminal T of the swich SMS2. Therefore, when the resistance value of the resistor RF2 becomes a value corresponding to a stop value that results in exposure suitable for the brightness of the object, sensitivity of the film and the shutter time Tsm, the comparator $COM_1$ produces an output to operate the magnet Mg3. By this, the action of the stop preset ring is stopped through a known mechanism and the stop aperture is restricted. In response to the operation of the magnet Mg3, the shutter front diaphragm clamping lever SF1 releases the front diaphragm SF of the shutter from clamping to allow the front diaphragm to begin its travel. By this, the count switch $S_1$ is turned off and the capacitor CT is charged through the resistance $RM_1$ and switches SMS4 and $ST_1$. Since the resistance value of the resistor $RM_1$ has been adjusted to a value corresponding to the shutter time Tsm, the output of the comparator COM2 is produced after a period of time Tsm to operate the magnet $Mg_1$. By this, the shutter rear diaphragm clamping lever SB1 shown in FIG. 5 is caused to release the rear diaphragm from clamping to complete the exposure. Then the switch S2 is turned off by this; the thyristor SCR4-1 is turned off; and, at the same time, the transistor on which a high level of volage has been impressed through the terminal $t_1$ is also turned off. By this, the transistor Tr4-5 is turned on to cause the motor M to initiate the film winding shutter charging operation through the couplers $CP_1$ and CP2 shown in FIG. 5. Upon completion of shutter charging, the switch S2 is again turned on; a high lever of voltage is impressed upon the transistor Tr4-4 through the terminal $t_1$ to turn on the transistor Tr4-4 and to turn off the transistor Tr4-5; the motor comes to a stop; and the winding operation is completed . Since a high level of voltage is also impressed upon the AND gate $AND_1$ at this time, when a pulse is transmitted there-from the interval timer, the transistor Tr4-1 is turned on again to turn on the thyristor SCR4-1 to operate the magnet Mg2. The series of the above stated photographing processes are repeated in this manner. The foregoing represent a case where the computed shutter time becomes longer than the shutter time Tsm. However, when the computed shutter time is shorter than the shutter time Tsm, the oscillation cycle of the PUT' becomes Tc − Tw < Tsm as shown at (2) in FIG. 6B and the output of the flip-flop circuit $FF_1$ and that of the monostable multivibrator $MM_1$ become as shown as (3) and (4) in FIG. 6B. Accordingly, the output of the OR gate becomes as shown at (5) in FIG. 6B and the on-time of the OR gate becomes Tw + Ts < Tc. Furthermore, by this, the output $\overline{Q}$ of the flip-flop circuit FF2 comes to take a wave form as shown at (6) in FIG. 6B and the output obtained through the delay circuit comes to take a wave form as shown at (7) in FIG. 6B. Therefore, the AND gate AND2 does not produce any output and the flip-flop circuit FF3 is not set. Accordingly, the light emitting diode is not lighted thus indicating that the photographing operation can be made in the stop preference mode. The magnet Mg4 remains inoperative; each switch is retained in the position for the stop preference mode; and photographing is carried out in the stop preference mode. In other words, the photographer first makes sure through the light emitting diode that photographing can be done in the stop preference mode; then he operates an unillustrated test button to connect switches $ST_1$ and ST2 to terminals M. This causes the magnet Mg2 to operate to control the stop as described in the foregoing. Then, since the stop preference mode has been selected beforehand by means of an unillustrated member and switches $SMS_1$ through SMS4 has been connected to the side F, the voltage dividing point between the resistors $RF_1$ and RF2 is connected to one input terminal of the comparator $COM_1$ while a constant potential of voltage dividing resistance is impressed on the other input terminal of the comparator $COM_1$. Therefore, the comparator $COM_1$ produces an output when the resistance value of the resistor RF2 becomes a value that corresponds to the resistance value of the resistor $RF_1$. Furthermore, since the resistance value of the resistor $RF_1$ has been adjusted to a value that corresponds to a preset stop value in response to the operation of the stop ring F1, the comparator $COM_1$ produces an output when the resistance value of the resistor RF2 becomes a value corresponding to the preset stop value, i.e. when the stop aperture value is adjusted to the preset stop value. The output causes the magnet Mg3 to operate to control the stop and, at the same time, to allow the front diaphragm of the shutter to travel. Since one input terminal of the comparator COM2 is connected to the capacitor CM and the other input terminal of the comparator is connected to the output terminal of a time constant circuit comprising a capacitor CT and a resistor RF3 which has a resistance value corresponding to the stop value preset in response to the movement of the stop ring F1, the magnet $Mg_1$ operates after a length of shutter time corresponding to the brightness of the object to allow the rear diaphragm of the shutter to travel and to actuate the motor M by turning the switch S2 for winding operation. When the next pulse is transmitted to the point $a_1$, the above described series of processes are repeated for a continuous photographing operation.

FIG. 7 illustrates the structural details of the stop mechanism of the camera illustrated in FIGS. 4 and 5 as an example. In FIG. 7, the mechanism is illustrated as in a state of having completed the film winding/shutter charging operation. The stop ring F1 is provided with engraved automatic and manual stop indexes. The reference numeral 302 indicates a mark provided for positioning the automatic and manual stop indexes, the reference numeral 303 indicates a stop preset ring which is urged by a spring 303a to rotate clockwise. The stop preset ring 303 is provided with an arm 303c and serves to determine the rotation of a bell crank through an unillustrated stop setting cam ring. The bell crank serves to restrict the rotation of an unillustrated stop drive ring to determine the aperture of the stop. A pin 304 is planted in the stop drive ring. The end of the pin 304 is urged by a spring 305a to rotate counterclockwise and thus engages with an automatic stop lever 305. The automatic stop lever has a rising portion 305c. An intermediate lever 307 is pivotally attached to the shaft 306 of the automatic stop lever 305. The reference numeral 308 indicates a winding shaft of an unillustrated winding lever. A winding cam 309 is secured to the end face of the winding shaft 308. The reference numeral indicates a rotatable intermediate lever. A pin 310a which is provided at one end of the intermediate lever 310 engages with the winding cam 309. A pin 310b is provided at the other end of the intermediate lever 310. The pin 310b engages with one end of the above stated intermediate lever 307 and also with one 311a of a mirror driving lever 311. A first clamping lever 313 is charged by a pin 310c provided on the intermediate lever 310. The other end of the lever 307 is arranged to be able to engage with a pin 312a which is provided at one end of a rotatable charge lever 312. The charge lever 312 is urged by a spring 312d to rotate counterclockwise. The magnet Mg2 which is mentioned in the foregoing engages with one end 313d of the first clamping lever 313. The other end 313b of the lever 313 engages with one end 314a of a release lever 314 while a spring 313c is in contact with the end 313b. When the pin 310c which is provided on the intermediate lever rotates, it comes to engage with the cam face 313d of one end of the first clamping lever 313. At one end of the release lever 314, there is provided a pin 314b. While one end 315b of a mirror drive engagement lever 315 engages with one side 311c of the mirror drive lever 311, the other end 315a of the lever 315 is in contacct with the pin 314b. One end of a rotatable EE locking lever 316 engages with the end parts 314d and 314e of the lever 314 while a pin 312b which is planted in the charge lever 312 engages with the same end of the lever 314. A pin 314c is planted in another end part of the release lever 314 with a movable contact piece of a memory holding switch SM contacting the pin 314c. The release lever 314 is urged by a spring 314f to rotate counterclockwise. An EE sector gear 318 is in engagement with the other end of the above stated locking lever 316. Gears 319a and 319b and a stop wheel 319c which constitute a speed governor mechanism 319 are engaging with the sector gear 318. A slider Ra$_1$ which is used for determining a preset stop value is also attached to the sector gear 318. A gear 320 is attached to the shaft 318a of the sector gear 318, while an EE charge gear 321 engages with the gear 320. A lever 327 is coaxially secured to the gear 321. The lever 327 is in contact with a stepped part 312e of the charge lever 312. A pin 318b is planted in the sector gear 318. The end face of the pin 318b is secured to a signal lever 329 which is pivotally attached to a supporting lever 328. A bent end of the signal lever engages with the arm 303c of the preset ring 303. The EE sector gear 318 is strongly urged to rotate clockwise against the spring 318c which is urged to rotate counterclockwise over the sector gear 318.

The reference symbol Mg3 indicate a control magnet having a permanent magnet. The magnet Mg3 is arranged to be able to attract an iron piece 331 which is attached to an attraction lever 330. The attraction lever 330 is urged by a spring 331a to rotate counterclockwise with one bent end of the lever 330 being arranged to be able to engage with the stop wheel 319c of the speed governor mechanism 319. The other end of the attraction lever 330 is in contact with one of the forked ends 312f of the charge lver 312. The mirror drive lever 311 which is mentioned in the foregoing is provided with a delaying device. While the mirror drive lever 311 is urged by the spring 311d to rotate counterclockwise, one end of the lever is in contact with the other side of the above stated mirror driving engagement lever 315. Meanwhile, a mirror clamping lever 336 is in contact with the clamping portion 311b of the mirror drive lever 311. The clamping lever 336 is urged to rotate counterclockwise by a spring 336a which is bridged between the mirror drive lever 311 and the clamping lever 336 while one end of the lever 336 engages with a lifting lever 337 which is coaxially held with the mirror drive lever 311. One end portion 337a of the lifting lever 337 is arranged to be rotated clockwise by a mirror lifting action in such a way as to be able to lift up the mirror by itself. The other end portion of the lifting lever 337 is in engagement with a recoiling pin 338a which is provided on the mirror 338. The mirror 338 is rotatable on its shaft 338b. A spring 338c is provided for returning the mirror. Since the operation of the arrangement described in the foregoing is not directly related to this invention the operation of it is briefly explained as follows:

With the electric power supplied to the magnet Mg2, the magnet is reversely excited to lose its magnetic power. Then, the first clamping lever 313 is rotated clockwise by the force of the spring 313c. This causes the spring 314f to rotate the release lever 314 counterclockwise to turn off the memory switch SM through the pin 314c. At the same time, the locking lever 316 is rotated counterclockwise to undo the engagement with the sector gear 318. The spring 303a then causes the gear 318 to rotate clockwise together with the rotation of the stop preset ring. By this, the slider Ra is caused to slide over the resistor RF2 to adjust the resistance value of the resistor RF2 to a stop value determined by the stop preset ring. Then, when the magnet Mg3 is reversely excited by an output of the comparator COM$_1$, the spring 331a causes the lver 330 to engage with the stop wheel 319c. The gear 318 and the ring 303 are stopped to determine the value of the stop aperture. On the other hand, the rotation of the lever 314 causes the mirror drive locking lever 315 to release the mirror drive lever 311 from locking. The lifting lever 337 is rotated by the spring 311d. The bent portion 337b causes the automatic stop lever 305 to rotate. The pin 304 which is planted in the stop drive ring is operated by this to stop down the stop into a present position. Meanwhile, the rotation of the lever 337 pushes the recoiling pin 338a of the mirror 338 upward and the mirror is lifted thereby.

As described in detail in the foregoing, when photographing is being carried out in a stop preference mode with the motor driven photograping control circuit of this invention, the feasibility or infeasibility of the photographing operation within a photographing cycle with a computed length of shutter time is discriminated. If it is infeasible to complete the photographing operation within the photographing cycle, a warning is displayed; and, concurrently with the warning, the operation of the camera is automatically shifted to a preset length of shutter time and the stop is controlled according to the preset shutter time in such a manner as in a so-called "magic shutter" operation. Thus, with the invented control circuit employed, continuous photographing can be always accomplished in a constant photographing cycle as desired by the photographer. The use of the invented control circuit is highly advantageous for a camera that operates in combination with a motor drive unit.

What is claimed is:

1. A motor driven photographing control circuit comprising;
    1. a motor drive device including a interval timer which produces a photographing start signal in a preset cycle, and, at least, a film winding circuit which controls a shutter charging action;

2. a camera which begins an exposure control action in response to the photographing start signal from the interval timer, the camera including;
   a. a shutter time control circuit which controls a shutter at a shutter time corresponding to the brightness of a photographing object, the shutter time control circuit being connected to said film winding circuit to transmit a shutter control action completion signal to the winding circuit for actuating the winding circuit;
   b. a discriminating circuit which detects a shutter time controlled by the shutter time control circuit, a length of the cycle time of the interval timer and a length of time for the action of the winding circuit and which produces an output when the detected shutter time becomes longer than a length of time obtained by subtracting the length of time required for the action of the winding circuit from the length of the cycle time of the interval timer; and
   c. a display circuit which makes a display in response to the discriminating circuit.

2. A motor driven photographing control circuit comprising;
   1. a motor drive device including an interval timer which produces a photographing start signal in a preset cycle, and, at least, a film winding circuit which controls a shutter charging action;
   2. a camera which begins an exposure control action in response to the photographing start signal from the interval timer, the camera including;
      a. a photometric circuit which produces an output corresponding to the brightness of a photographing object;
      b. a source of shutter time information having a shutter time value which corresponds to a length of time obtained by subtracting a length of time required for the action of the film winding circuit from the length of the cycle time of said interval timer;
      c. a shutter control circuit which controls a shutter;
      d. a connecting means for selectively connecting the photomeric circuit and the shutter time information source to the shutter control circuit;
      e. a shutter time computing circuit for computing a shutter time based on an output of the photometric circuit; and
      f. a discriminating circuit connected to the connecting means, the discriminating circuit being arranged to produce an output when the shutter time computed by said shutter time computing circuit is longer than the shutter time value of said shutter time information source, the output being transmitted to the connecting means, which then, in response to the output, connecting the shutter time information source to the shutter control circuit.

3. A circuit as defined in claim 1, said shutter time control circuit including a photomeric circuit which produces an output corresponding to the brightness of the photographing object.

4. A circuit as defined in claim 3, said discriminating circuit including a shutter time computing circuit which computes a shutter time based on said photomeric circuit; a winding action time information forming circuit which produces information on a set length of time corresponding to the action time of the winding circuit; an addition circuit which produces time information obtained by adding said shutter time to a preset length of time; a cycle information forming circuit which produces cycle time information corresponding to the cycle of the interval timer; and a comparison circuit which compares the time information produced by the addition circuit with the cycle time information and which produces an output when the time information is greater than the cycle time information.

5. A circuit as defined in claim 2, said camera including a stop control circuit which is connected to said photomeric circuit through said connecting means to control a stop value according to the output of the photomeric circuit, the connection of the stop control circuit to the photomeric circuit being effected according to the output of said discriminating circuit.

6. A circuit as defined in claim 2, said discriminating circuit including a film winding action time information forming circuit which produces information on a preset length of time corresponding to a length of time required for the action of the winding circuit; an addition circuit which produces information on a length of time obtained by adding a preset length of time to a shutter time computer through said shutter time computing circuit; a cycle information forming circuit which produces information on a length of cycle time corresponding to the cycle of said interval timer; and a comparison circuit which compares the time information produced by the addition circuit with the cycle time information and which produces an output when the time information is greater than the cycle time information.

7. A motor driven photographing control circuit including a motor drive device which repeats a shutter releasing action for a camera having a stop preference function and a shutter time controlling function and which also repeats at least a shutter charging action through a film winding means, the motor driven photographing control circuit comprising;
   a. a shutter release cycle controlling means which produces a first signal for the shutter releasing action in a preset cycle to control the shutter release to be made in the preset cycle according to the signal;
   b. a shutter time signal forming circuit which produces a second signal corresponding to a shutter time being controlled by said camera;
   c. a shutter release cycle time signal forming means which produces a third signal corresponding to the cycle time of the first signal, the cycle time signal forming means being connected to the shutter release cycle controlling means,
   d. a discriminating circuit which is connected to the shutter time signal forming circuit and to the shutter release cycle time signal forming means to produce an output when the second and third signals come to be in a preset relation to each other; and
   e. a display circuit which produces a warning in response to the output of the discriminating circuit.

8. A motor driven photographing control circuit comprising;
   1. a photographing operation controlling means which produces a photographing operation start signal;
   2. a photomeric circuit which measures the brightness of a photographing object in response to the photographing operation controlling means;
   3. a shutter control circuit which controls a shutter time based on the output of the photometric circuit;

4. a film winding control circuit which performs at least a film winding action, the winding control circuit being arranged to operate at least in response to a shutter control action completion signal produced by said shutter control circuit;

5. a cycle signal forming circuit which is connected to the photographing operation controlling means and produces a first signal in a preset cycle, the photographing operation controlling means producing the photographing operation start signal in response to the first signal;

6. a shutter time signal fomring means for producing a second signal which correspond to the shutter time controlled by the shutter control circuit;

7. a cycle time signal forming circuit which is connected to the cycle signal forming circuit to produce a third signal corresponding to the preset cycle time;

8. a discriminating circuit which is connected to the cycle time signal forming circuit and to the shutter time signal forming means to produce an output when the second signal comes to be in a preset relation to the third signal; and 9. a display circuit which makes a display in response to the output of the discriminating circuit.

9. A motor driven photographing control circuit as defined in claim 7, wherein said discriminating circuit comprises a winding action time signal forming means which produces a fourth signal corresponding to a preset length of time required for the shutter charging action by the motor drive device; a time addition circuit which produces a fifth signal corresponding to a length of time obtained by adding the preset length of time to the shutter time based on the second signal and the fourth signal; and a comparison circuit which compares said third signal with the fifth signal and produces an output when the fifth signal becomes greater than the time represented by the third signal.

* * * * *